April 1, 1952 H. M. WADSWORTH 2,591,644

VARIABLE ELECTRICAL CONDENSER

Filed Dec. 15, 1949 2 SHEETS—SHEET 1

INVENTOR.
Howard M. Wadsworth
BY
Clinton S. James
ATTORNEY

WITNESS:
Esther M. Stockton

April 1, 1952 H. M. WADSWORTH 2,591,644

VARIABLE ELECTRICAL CONDENSER

Filed Dec. 15, 1949 2 SHEETS—SHEET 2

WITNESS:

*Elwood M. Stockton*

INVENTOR.

*Howard M. Wadsworth*

BY

*Clinton S. Janes*

ATTORNEY

Patented Apr. 1, 1952

2,591,644

UNITED STATES PATENT OFFICE 2,591,644

VARIABLE ELECTRICAL CONDENSER

Howard M. Wadsworth, Liverpool, N. Y.

Application December 15, 1949, Serial No. 133,158

1 Claim. (Cl. 175—41.5)

The present invention relates to a negative coefficient trimmer condenser for electronic circuits, and more particularly to a small adjustable condenser which is so constructed that changes in temperature cause inversely corresponding changes in capacity.

The present invention is an improvement over the trimmer condenser disclosed in the application of Wadsworth, Serial Number 88,743, filed April 21, 1949, now Patent No. 2,541,897, issued February 13, 1951.

In electronic devices of various types incorporating tuned oscillating circuits, and specifically in radio and television apparatus, it is desirable that the frequency of such circuits be as constant as possible irrespective of temperature variations so that acceptable performance of the devices may be obtained without the necessity of waiting for the parts to become warmed up to a stable operating temperature. The inductances commonly used in such circuits are, however, of such character that they have a positive temperature coefficient; that is, the inductive impedance increases as the temperature rises, so that if no correction is made, the frequency of the oscillating circuit will be lowered.

It is an object of the present invention to provide an adjustable condenser for oscillating electrical circuits so constituted that a rise in temperature thereof causes a decrease in the electrostatic capacity of the unit, tending to compensate for the effect of the temperature change of the other components of such oscillating circuits.

It is another object to provide such a device in which the negative coefficient of the condenser may readily be varied in order to adapt the unit for use in various types of oscillating circuits.

It is another object to provide such a device in which the negative coefficient of the condenser remains substantially constant throughout the range of adjustment of the condenser.

It is another object to provide such a device which is simple and economical to manufacture, smooth in adjustment, and consistent in operation irrespective of commercially prevalent malformations of the dielectric body of the condenser.

Further objects and advantages will be apparent from the following description, taken in connection with the accompanying drawing, in which.

Figures 1, 2, 3, 4:
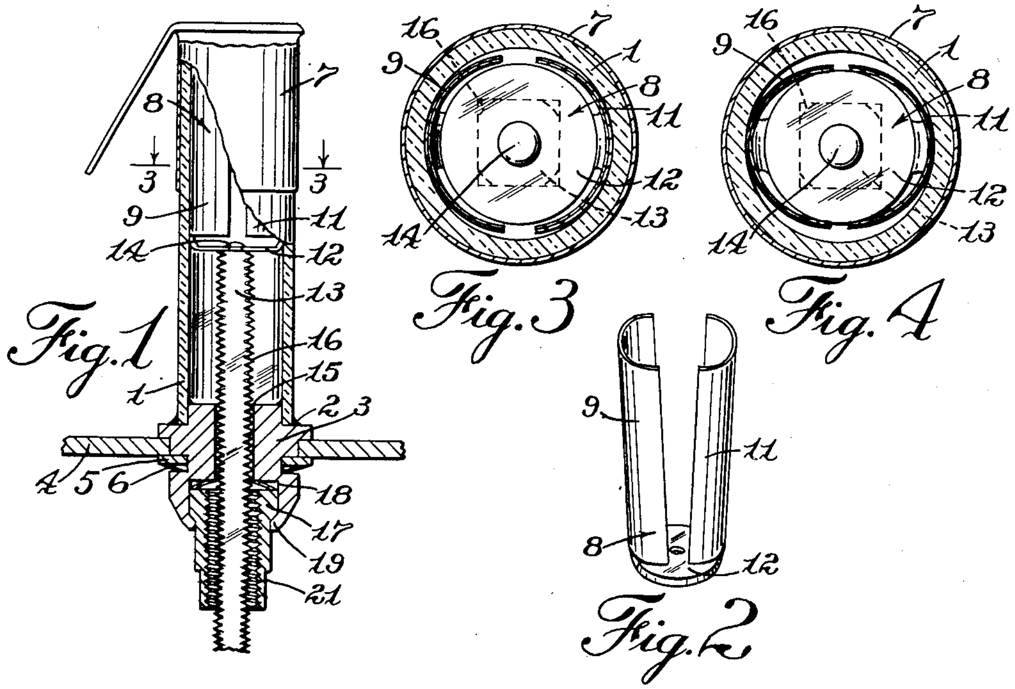
Fig. 1 is a side elevation, partly broken away and in section, of one preferred embodiment of the invention.
Fig. 2 is a perspective detail of the inner electrode of the condenser shown in Fig. 1.
Fig. 3 is an enlarged section taken substantially on the line 3—3 of Fig. 1.
Fig. 4 is a view similar to Fig. 3 showing in an exaggerated manner the effect of a rise in temperature of the unit.

In Fig. 1 of the drawing there is illustrated a dielectric tube 1 of suitable material such as glass which is rigidly mounted at one end as indicated at 2 in a metallic bushing 3 which is arranged to be held in a panel 4 by suitable means such as a thrust washer 5 and spring fork member 6. The exterior of the dielectric tube 1 has fixed thereon an external electrode 7 which may be a metalized coating of the tube and which extends somewhat less than half-way down the tube.

An inner electrode 8 (Fig. 2) formed of two semi-cylindrical portions 9, 11, joined by an annular bridge member 12 is slidably mounted within the tube 1; and means for adjusting the inner electrode longitudinally to vary its telescopic relation with the outer electrode 7 is provided in the form of a screw shaft 13 fixed as indicated at 14 to the bridge member 12 and traversing the mounting bushing 3. The shaft 13 is of square cross-section and is slidably received in a squared opening 15 in the bushing 3. Means for adjusting the shaft 13 axially is provided by threading the corners of the shaft as indicated at 16, and providing a nut 17 engaging said threads and rotatably mounted in an enlarged opening 18 in the bushing 3 where it is retained by spinning over a lip 19 on the end of the bushing. The lower end of the nut 17 is provided with a suitable non-circular extension 21 for the reception of a wrench whereby the nut may be rotated to adjust the shaft 13 and thereby vary the overlapping relation of the electrodes 7 and 8, so as to adjust the capacity of the condenser.

According to the present invention, the inner electrode 8 is made of thermostatic bi-metal. That is, sheet material formed of two metallic layers united as by brazing or welding, the two layers having substantially different coefficients of thermal expansion. The component having the higher coefficient of expansion is arranged to be on the outside of the electrode whereby a rise in temperature causes the semi-cylindrical parts 9 and 11 of the electrode to curl inwardly so as to reduce their radii.

The inner electrode 8 is ordinarily formed as shown in Fig. 2 with the parts 9 and 11 in slightly in slightly divergent relation before the electrode is inserted in the dielectric tube 1. This causes these parts to be elastically pressed against the interior of the dielectric tube when the electrode is inserted therein so as to maintain their medial portions in contact with the tube at all times. The cylindrical curvature of the parts 9 and 11 of the inner electrode is such that when the condenser is cold, the edges of said parts are very slightly spaced from the interior surface of the tube 1 as indicated in Fig. 3.

Figure 5:
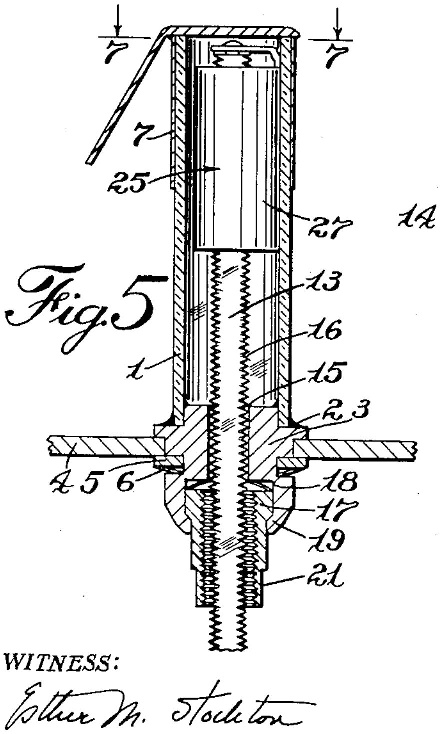
Fig. 5 is a view similar to Fig. 1 showing a second embodiment of the invention.
Figure 7:
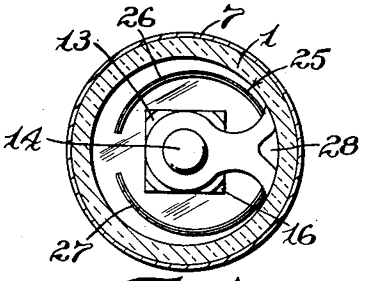
Fig. 7 is a section taken substantially on the line 7—7 of Fig. 5 shown on an enlarged scale.
Figure 6:
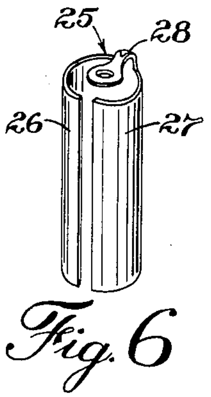
Fig. 6 is a detail in perspective of the inner electrode shown in Fig. 5.

In utilizing this condenser it is merely necessary to connect the two electrodes in the oscillatory circuit to be tuned in the usual manner, and the nut 21 adjusted to secure the desired frequency of oscillation of the circuit. Thereafter, a rise in temperature of the other components of the circuit which would normally cause a lowering of the frequency of oscillation of the circuit is counteracted by the effect of the same rise in temperature on the inner electrode 8 of the condenser. This rise in temperature causes the parts 9 and 11 of said inner electrode to curl away from the interior of the tube 1 as shown in an exaggerated manner in Fig. 4. This increases the average distance between the inner and outer electrodes and consequently reduces the capacity of the condenser so as to provide the desired compensating effect.

Where a still greater negative coefficient may be desired this may be secured in the manner shown in Figs. 5, 6 and 7. The structure here shown is substantially similar to that illustrated in Fig. 1 except that in this case the inner electrode 25 (Fig. 6) is formed of a single split cylinder instead of two semi-cylindrical members. An increase in temperature of this electrode accordingly causes the sides 26, 27 to curl inwardly from the median line of the cylinder 28 as shown in an exaggerated manner in Fig. 7, thus accordingly decreasing the capacity of the condenser.

Figure 8:
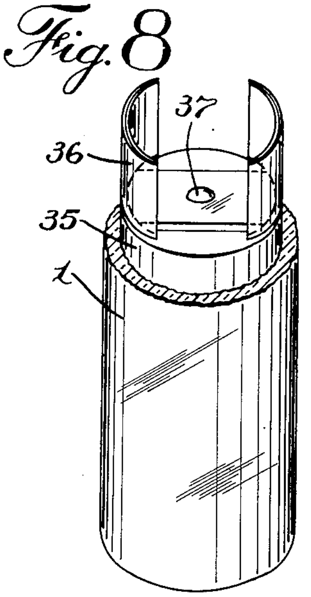
Fig. 8 is a detail in perspective of an inner electrode and a portion of the dielectric tube, of an embodiment in which a portion only of the inner electrode is arranged to provide a negative thermal coefficient.

In some installations, it has been found that the negative coefficient secured by the structure heretofore described is greater than necessary, so that it becomes important to provide arrangements for securing smaller negative coefficients in a convenient and readily controlled manner. In Fig. 8 this is accomplished by the use of an inner electrode 35, the main portion of which is a cylinder of any suitable metallic material such as Invar. A negative coefficient portion 36 formed substantially similar to the interior electrode 8 of Fig. 1 but shorter in length is attached to the main portion of the electrode in any suitable manner as indicated at 37. The operation of this embodiment is similar to that first described except that the negative coefficient of the condenser is reduced in view of the short length of the portion 36 which is formed of the thermostatic bi-metal.

Figure 9:
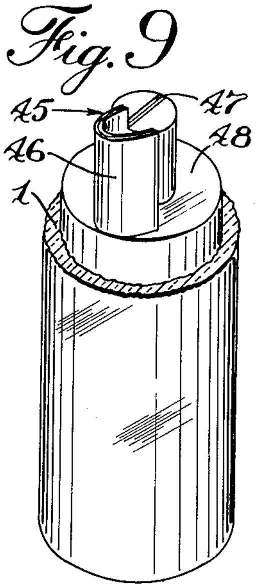
Fig. 9 is a view similar to Fig. 8 showing another form of inner electrode.

Fig. 9 shows a structure for securing a still smaller negative coefficient. As there shown a plate or wafer of bi-metal 45 is provided with a curved portion 46 engaging slidably the interior of the dielectric tube 1, and a tongue 47 slidably received in a slot in the end of the main portion 48 of the interior electrode. The component of the bi-metal having the higher coefficient of expansion is on the outside of the curve, so that an increase in temperature of the condenser causes the curved portion 46 of the bi-metallic element to curl away from the interior of the dielectric tube so as to reduce the capacity of the condenser as heretofore described.

Figure 10:
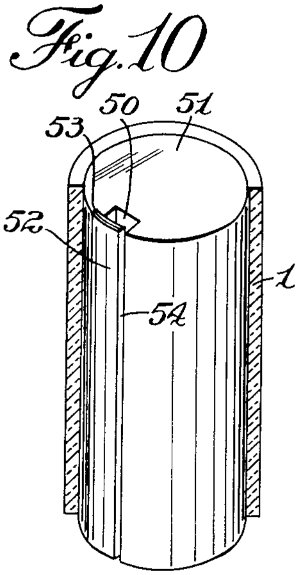
Fig. 10 is a view similar to Fig. 8 showing an inner electrode arranged to provide a small negative coefficient which is uniform irrespective of longitudinal adjustment of the electrode.

In Fig. 10 there is illustrated a form of the invention which provides a small negative coefficient which is uniform throughout the adjustment of the condenser in the same manner as the forms illustrated in Figs. 1 and 5. As here shown, this is accomplished by forming a longitudinal slot 50 in an interior electrode 51 of any suitable material, and rigidly mounting at one edge a strip 52 of thermostatic bi-metal as indicated at 53 so that the bi-metal strip extends nearly across the slot. In this case also, the component of bi-metal having the larger coefficient of expansion is arranged externally of the electrode so that an increase in temperature causes the free edge 54 of the bi-metallic strip to bend inwardly away from the interior of the dielectric tube 1 so as to decrease the capacity of the condenser.

Figure 11:
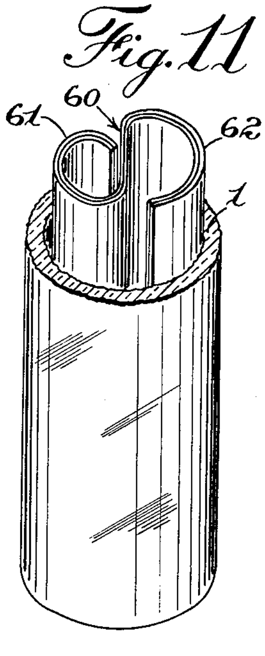
Fig. 11 is a similar view showing still another form of internal electrode providing a uniform small negative coefficient.

In Fig. 11 there is illustrated a form of inner electrode 60 formed of thermostatic bi-metal which is rolled up so as to provide an S-shaped cross-section. One of the curled portions 61 of the electrode has its component of higher coefficient of thermal expansion located exteriorly, whereas the other curled portion 62 has its component oppositely arranged due to the reverse curvature of the electrode. When the electrode is not inserted in the tube, an increase of temperature would therefore cause the portion 61 to curl inwardly and the portion 62 to uncurl outwardly. When the electrode is inserted in the tube, however, the portion 62 is in surface contact with the interior of the tube and an increase in temperature has no effect thereon except to somewhat increase the pressure of the electrode against the interior surface of the dielectric tube. The portion 61 however, curls inwardly with the increased temperature and thus secures the desired reduction in the capacity of the condenser. This embodiment therefore secures a negative coefficient which is uniform throughout its range of adjustment and may have values intermediate the embodiments illustrated in Figs. 1 and 10.

It will be understood that in all the embodiments disclosed, the desired value of negative coefficient may be secured by choice of thickness and composition of the bi-metal, and by the initial spacing of the free edges of the bi-metal from the dielectric tube when the parts are cold.

Although certain embodiments of the invention have been shown and described in detail, it will be understood that other embodiments are possible, and various changes may be made in the design and arrangement of the parts without departing from the spirit of the invention.

What is claimed is:

In a variable trimmer condenser, a tube of dielectric material, an exterior cylindrical electrode surrounding the tube and extending from one end substantially half the length of the tube, an inner electrode slidably mounted in the tube comprising a part-cylindrical portion of uniform circumferential extent throughout the length of said electrode and having substantially full surface contact with the tube, and a second part-cylindrical portion which is also of uniform circumferential extent and rigidly connected at its edge throughout its length to the edge of the first portion, said second portion being formed of integrated metallic laminations having different coefficients of thermal expansion, free from contact with the tube except adjacent its junction with said first mentioned portion, and means for sliding the inner electrode in the tube to vary the capacity of the condenser; the lamination of the second portion of the inner electrode which has a higher coefficient of thermal expansion being located on the outer side of the electrode.

HOWARD M. WADSWORTH.

REFERENCES CITED

The following references are of record in the file of this patent:

UNITED STATES PATENTS

| Number | Name | Date |
|---|---|---|
| 2,100,412 | Scott | Nov. 30, 1937 |
| 2,123,050 | Johnson | July 5, 1938 |
| 2,394,947 | Stephens | Feb. 12, 1946 |
| 2,541,897 | Wadsworth | Feb. 13, 1951 |

FOREIGN PATENTS

| Number | Country | Date |
|---|---|---|
| 602,270 | Germany | Sept. 5, 1934 |